United States Patent [19]
Chikuma

[11] Patent Number: 5,119,384
[45] Date of Patent: Jun. 2, 1992

[54] OPTICAL WAVELENGTH CONVERTER AND METHOD OF MANUFACTURING THE SAME

[75] Inventor: Kiyofumi Chikuma, Saitama, Japan

[73] Assignee: Pioneer Electronic Corporation, Tokyo, Japan

[21] Appl. No.: 699,582

[22] Filed: May 14, 1991

[30] Foreign Application Priority Data

Oct. 22, 1990 [JP] Japan .................................. 2-285517

[51] Int. Cl.$^5$ ................................................ H01S 3/10
[52] U.S. Cl. ......................................... 372/21; 359/326
[58] Field of Search ...................... 372/21, 22; 359/326

[56] References Cited
U.S. PATENT DOCUMENTS 4,925,263 5/1990 Sanford et al. ......................... 372/21

Primary Examiner—Leon Scott, Jr.
Attorney, Agent, or Firm—Fleit, Jacobson, Cohn, Price, Holman & Stern

[57] ABSTRACT

An optical wavelength converter comprises a waveguide passage made of nonlinear optical crystal, and a substrate provided in contact with the waveguide passage, all dielectric main axes of the nonlinear optical crystal being inclined with respect to an extending direction of the waveguide passage. According to a method of manufacturing an optical wavelength converter, a fluid consisting of an organic nonlinear optical crystal material introduced in a bending groove in a substrate is crystallized in order starting from the side of one portion of the bending groove to thereby form an organic nonlinear optical crystal in the other portion of the groove, which has the crystal axis and dielectric main axis both inclined with respect to the extending direction of the other groove portion.

2 Claims, 4 Drawing Sheets

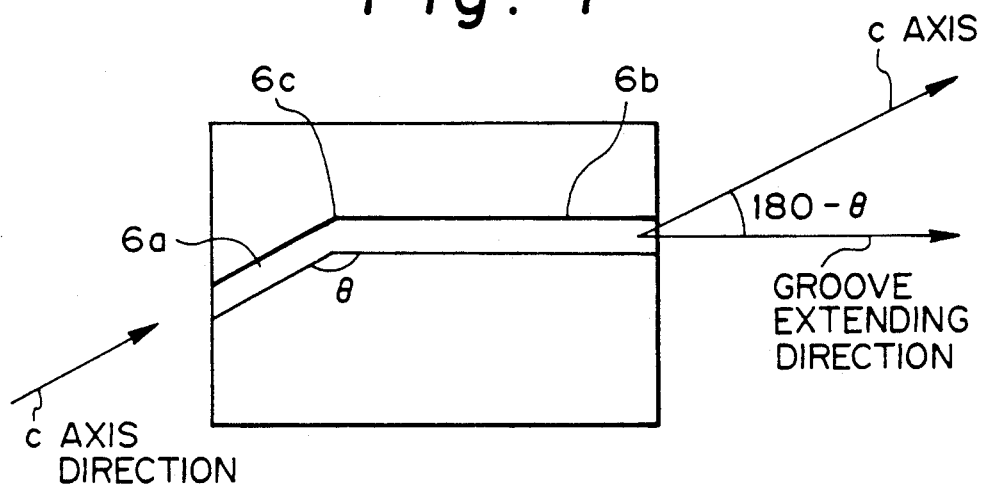
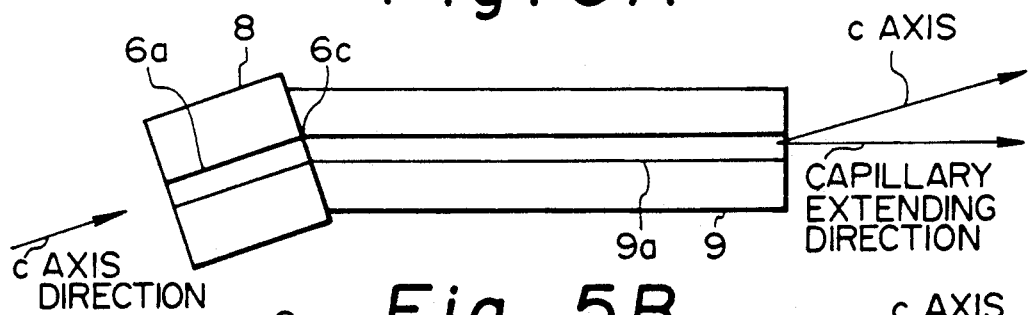
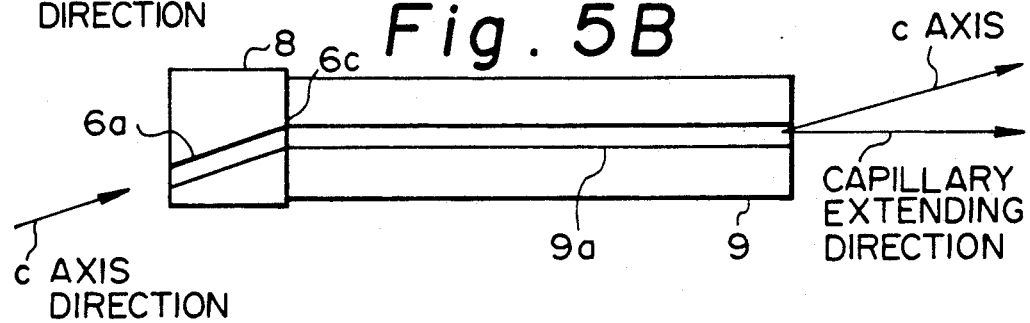

OPTICAL WAVELENGTH CONVERTER AND METHOD OF MANUFACTURING THE SAME

BACKGROUND OF THE INVENTION

1. Field of the Invention

The present invention relates to an optical wavelength converter which converts a semiconductor laser beam into light having half the wavelength of the laser beam.

2. Description of the Prior Art

There are different types of known optical wavelength converters. One of such optical wavelength converters is a waveguide passage type optical wavelength converter which has a channel type waveguide passage formed on the top of a rectangular substrate. Another type is an optical wavelength converter which is constituted in the shape of an optical fiber comprising a core of nonlinear optical crystal and a clad surrounding this core and employs the Cerenkov radiation phase matching. As one of these optical wavelength converters, a second harmonics generator (hereinafter referred to as "SHG") is known, which converts the wavelength of incident primary light into a half.

According to the Cerenkov radiation system of the fiber type SHG, it is possible to generate a second harmonics whose optical phase is almost automatically matched. The SHG is applied to a shortwave light generator or the like.

As shown in FIG. 1, the shortwave light generator comprises a semiconductor laser 11, a coupling lens 12, a fiber type SHG 13 having its core surrounded by a glass clad made of nonlinear optical crystal, and an axicon 14. The coupling lens 12 collects and guides the light emitted from the semiconductor laser 11 onto the end face of the SHG 13. The axicon 14 shapes the wavefront of the second harmonics, irradiated after conversion done by the SHG 13, so as to provide the second harmonics in the form of the parallel flux of light.

It is known that DMNP (3,5-dimethyl-1-(4-nitrophenyl)-pyrazole) is used as nonlinear optical crystal for the core of the fiber type SHG 13 according to the Cerenkov radiation system. According to this SHG, the c axis of the DMNP nonlinear optical crystal is set along the fiber axis (in the direction of the extension). Actually, if DMNP crystal is grown as a core in a hollow passage of the axis of a glass capillary used as a clad in a Bridgman furnace, crystal grows along the c axis. That is, the a and b axes lie within a plane perpendicular to the fiber axis, and the c axis is specified in the direction approximately coincident with the fiber axis. When the wavelength of a semiconductor laser beam, 830 to 870 nm, is to be converted by a fiber type optical wavelength converter having such a core crystal orientation, the refractive index $n^{2\omega}$ of the core to polarization of the second harmonics is a little greater than the refractive index $n^{\omega}$ of the core to polarization of the incident primary light. This hinders the desired improvement of the wavelength converting efficiency.

SUMMARY OF THE INVENTION

It is therefore an object of the present invention to provide a method of manufacturing an optical wavelength converter while controlling the direction of the crystal axis of nonlinear optical crystal for a waveguide passage in the wavelength converter.

It is another object of the present invention to provide an optical wavelength converter having high wavelength converting efficiency.

An optical wavelength converter according to the present invention comprises a waveguide passage made of nonlinear optical crystal, and a substrate provided in contact with the waveguide passage, all dielectric main axes of the nonlinear optical crystal being inclined with respect to an extending direction of the waveguide passage.

A method of manufacturing an optical wavelength converter according to the present invention comprises the steps of forming a continuous bending groove in at least one substrate by making a straight crystal guiding groove intersect a straight waveguide passage groove at a predetermined angle; introducing a molten liquid of an organic nonlinear optical material in the bending groove; and crystallizing the molten liquid in order from a side of the crystal guiding groove toward the waveguide passage groove.

According to the present method of manufacturing an optical wavelength converter, the dielectric main axes of the nonlinear optical crystal which forms a waveguide passage can all be inclined with respect to the extending direction of the waveguide passage.

According to the optical wavelength converter of the present invention, the variance of the refractive index of the waveguide passage is changed to increase the overlap integration of the electric field distribution of the second harmonics of the optical wavelength converter and the excited nonlinear polarization, thereby improving the optical wavelength converting efficiency of the optical wavelength converter.

BRIEF DESCRIPTION OF THE DRAWINGS

FIG. 4 is a plan view of bonded glass substrates;

FIGS. 5A and 5B are plane views showing a glass substrate having a crystal guiding groove joined with a glass capillary having a waveguide passage groove.

DETAILED DESCRIPTION OF THE PREFERRED EMBODIMENT

A preferred embodiment of the present invention will be described below referring to the accompanying drawings.

Figure 2A:
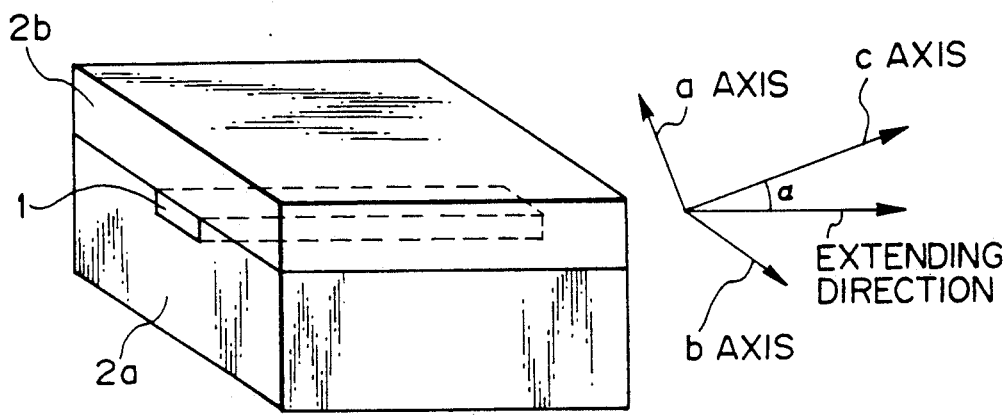
FIGS. 2A and 2B are perspective views of optical wavelength converters according to the present invention.
Figure 2B:
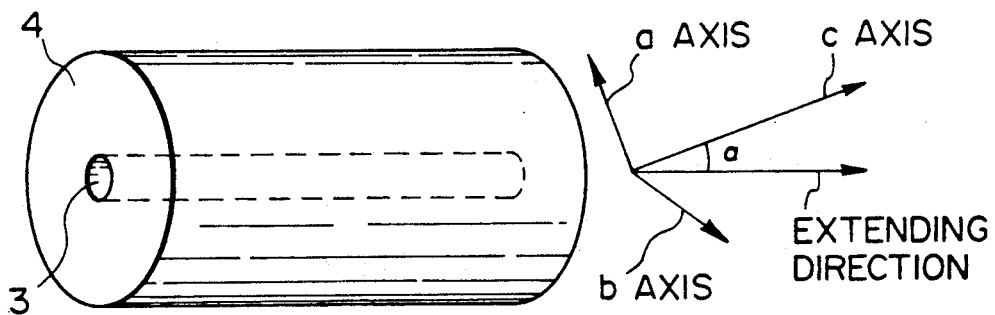

FIG. 2 is a perspective view showing an optical wavelength converter according to one embodiment of the present invention. The optical wavelength converter shown in FIG. 2A is of a channel type comprising a waveguide passage 1 having a rectangular cross section, and substrates 2a and 2b both also having a rectangular cross section, the substrates enclosing the waveguide passage 1. The optical wavelength converter shown in FIG. 2B is of a fiber type comprising a columnar core 3 and a cylindrical clad layer 4 enclosing the core 3 concentrically.

According to the optical wavelength converters of this embodiment as shown in FIGS. 2A and 2B, all the dielectric main axes of the waveguide passage of nonlinear optical crystal or the core are inclined to the extending direction of the waveguide passage or the core. This is because that the nonlinear optical crystal has crystal axes, namely the a axis, b axis and c axis, which are orthogonal to one another, and the c axis is inclined by a predetermined angle α to the extending direction of the waveguide passage or the core.

In particular, according to an optical wavelength converter which is of a fiber type and uses the Cerenkov radiation system, with the clad diameter taken as finite considering the presence of the boundary between the clad and the core, the electromagnetic field is analyzed to be expressed as overlapped discrete modes in which the second harmonics propagates in the clad. Further, as the converting efficiency for the second harmonics is expressed by an overlap integration of the nonlinear polarization excited by the fundamental wave and the electric field of the second harmonics, increasing the value of the integration will improve the converting efficiency.

The present inventors found out that to increase the value of the overlap integration of the nonlinear polarization and the electric field of the second harmonics in an optical wavelength converter using DMNP as the core, it is necessary to realize $n^\omega > n^{2\omega}$ where nm is a refractive index with respect to polarization of the primary light propagating in the extending direction of the core and $n^{2\omega}$ is a refractive index with respect to polarization of the second harmonics, and tried to satisfy this relationship by associating the vibrating surfaces of the incident primary light and the converted second harmonics with the core crystal axis (main dielectric axis) and changing the orientation direction of the crystal axis.

Figure 3A:
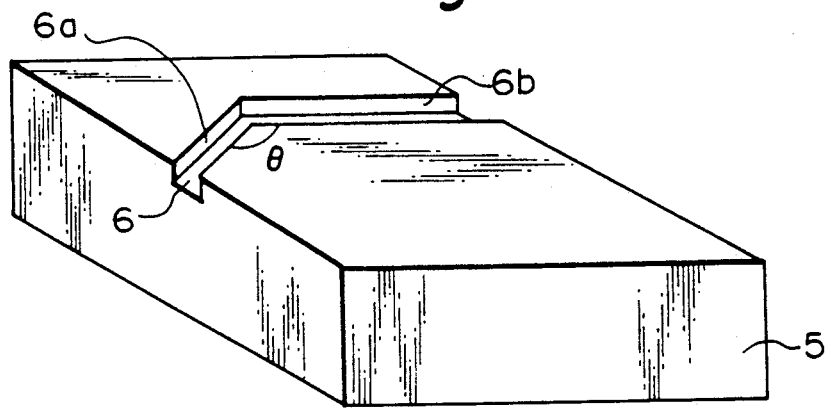
FIGS. 3A-3C are perspective views of a member for manufacturing an optical wavelength converter according to the present invention.
Figure 3B:
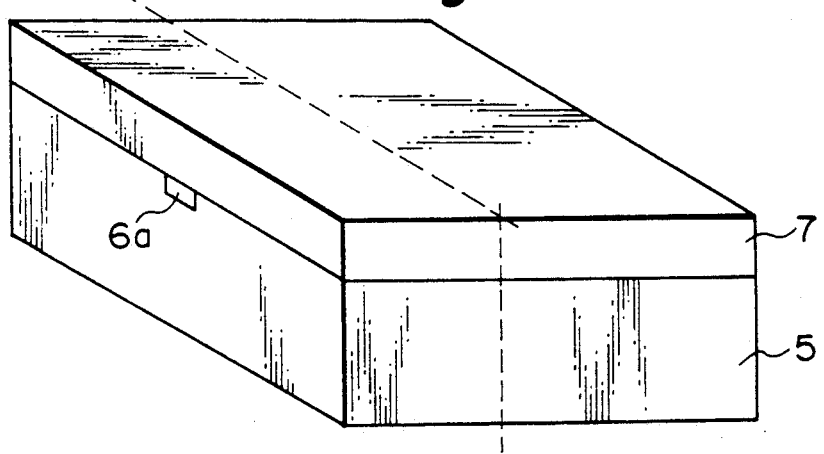
Figure 3C:
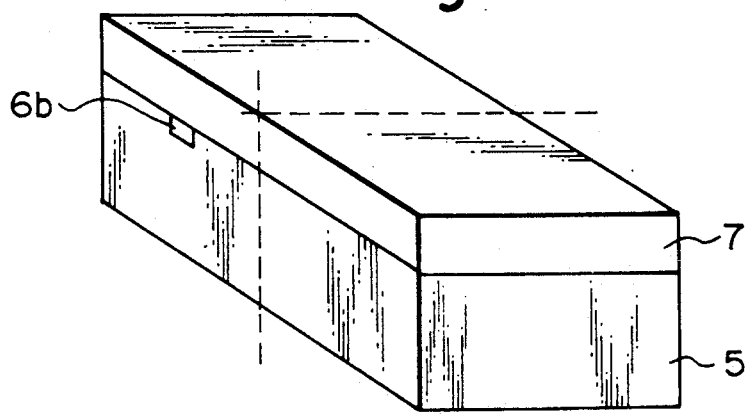

A description will now be given of how to produce a channel type optical wavelength converter. As shown in FIG. 3A, a groove 6 bending at a middle is formed in a first glass substrate 5, the angle at the bent portion, θ, being set to an angle formed by the c axis (X axis for the dielectric main axis) of the desired crystal and the extending direction of the waveguide passage. The bending groove 6 has two straight portions: a crystal guiding groove 6a and a waveguide passage groove 6b. Then, a second glass substrate 7 is stuck on the first glass substrate 5, covering the groove 6, thereby providing a glass-bonded substrate, as shown in FIG. 3B.

Then, a molten liquid consisting of an organic nonlinear optical crystal material is introduced in the bending groove 6, which consists of the crystal guiding groove 6a and the waveguide passage groove 6b. As shown in FIG. 4, crystal is grown starting from one end of the crystal guiding groove 6a utilizing the property that crystal is easy to grow along the c axis. The crystal grows with the c axis matching the extending direction of the crystal guiding groove 6a until the crystal growth reaches the bent portion 6c. Although the c axis does not match the extending direction of the waveguide passage groove 6b from the bent portion 6c onward while being kept in the extending direction of the crystal guiding groove 6a, the crystal continually grows without seam, with a constant angle (180−θ) formed between the extending direction of the waveguide passage groove 6b and the c axis of the crystal after the bent portion 6c. Accordingly, the X axis of the dielectric main axis of the core is inclined by this predetermined angle with respect to the extending direction of the waveguide passage groove.

Thereafter, as the crystal in the waveguide passage groove 6b forms a waveguide passage, that portion of the glass-bonded substrate where the waveguide passage groove 6b exists is cut, thus yielding a channel type optical wavelength converter. Since the X axis of the dielectric main axis of the core of this optical wavelength converter is inclined with respect to the extending direction of the waveguide passage, all the dielectric main axes of the core is inclined by a predetermined angle to the extending direction of the waveguide passage.

A description will now be given of how to produce a fiber type optical wavelength converter. As shown in FIGS. 5A 5 and 5B, a substrate 8 having a pair of glass substrates bonded together with only a straight crystal guiding groove formed therein is prepared, and the substrate 8 is then adhered to a glass capillary 9. In this case, the substrate 8 having the crystal guiding groove 6a formed perpendicular to the end face and the glass capillary 9 so cut as to have its capillary axis 9a inclined to the end face may be used as shown in FIG. 5A, or the substrate 8 having the crystal guiding groove 6a formed inclined to the end face and the glass capillary 9 having the capillary axis 9a perpendicular to the end face may be used as shown in FIG. 5B. Alternatively, it is possible to use the glass-bonded substrate and the glass capillary which respectively have the crystal guiding groove and the capillary axis inclined with respect to their end faces. The substrate 8 and the glass capillary 9 are then bonded together after that end of the substrate 8 where the crystal guiding groove 6a is exposed is aligned with the end face of the glass capillary 9 in such a way that a given angle 8 is formed between the glass capillary axis 9a and the crystal guiding groove 6a. Then, the crystal guiding groove 6a and the glass capillary 9 are set to form an obtuse-angled θ shape, crystal is grown from the side of the crystal guiding groove 6a, and the desired portion is cut, as per the above-described embodiment, thereby providing a fiber type optical wavelength converter.

Figure 1:
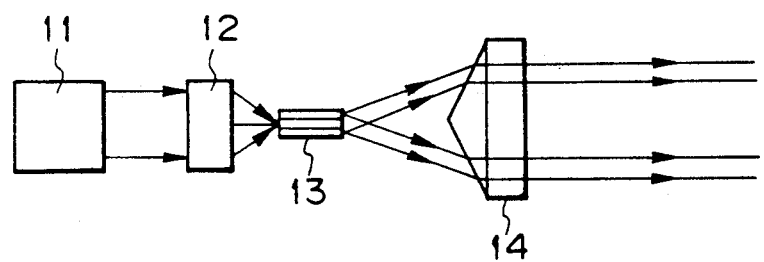
FIG. 1 is a schematic diagram of a shortwave light generator using a fiber type optical wavelength converter.
Figure 6:
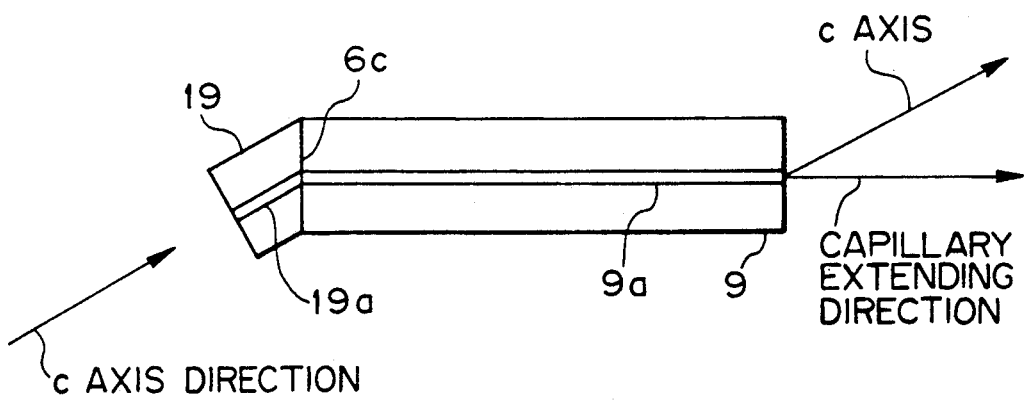
FIG. 6 is a plan view illustrating two glass capillaries joined together.

Alternatively, two glass capillaries 19 and 9 may be used with the capillary axis 19a of the glass capillary 19 serving as the crystal guiding groove as shown in FIG. 6, in which case a fiber type optical wavelength converter can also be provided as in the above-described embodiment.

As a practical example, a fiber type optical wavelength converter was prepared as shown in FIG. 5. With SF4 glass used for the glass capillary to be clad glass and DMNP used as nonlinear optical crystal for the core, the glass-bonded substrate having the crystal guiding groove inclined to the end face and the glass capillary 9 having the capillary axis perpendicular to the end face as shown in FIG. 5B were used and adhered together so that the glass capillary axis and the crystal guiding groove as shown in FIG. 2 form an angle of 155 degrees. The resultant fiber type optical wavelength converter had the b axis of the crystal (Y axis for the dielectric main axis) lying within a plane normal to the fiber axis, and the a axis 8 axis for the dielectric main axis) and the c axis (X axis for the dielectric main axis) lying in a plane containing the fiber axis, the c axis inclined by 25 degrees with respect to the fiber axis (extending direction). With the core diameter of 1.4 μm, the waveguiding power of the primary light of 40 mW and the fiber length of 1 mm, the converter showed a converting efficiency of 1%. Accordingly, it is possible to control the crystal orientation of the core in a fiber type optical wavelength converter.

As described above, an optical wavelength converter according to the present invention comprises a waveguide passage made of nonlinear optical crystal, and a substrate provided in contact with the waveguide passage, all dielectric main axes of the nonlinear optical crystal being inclined with respect to the extending direction of the waveguide passage. Therefore, the wavelength converting efficiency of the optical wavelength converter can be improved by changing the variance of the refractive index of the waveguide passage to increase the overlap integration of the electric field distribution of the second harmonics of the optical wavelength converter and the excited nonlinear polarization.

According to a method of manufacturing an optical wavelength converter of the present invention, a bending groove is formed in a substrate, a molten liquid consisting of an organic nonlinear optical crystal material is introduced in the groove, and this liquid is crystallized in order starting from the crystal guiding groove side toward the waveguide passage groove. It is therefore possible to form nonlinear optical crystal, which has the crystal axis and dielectric main axis both inclined with respect to the extending direction and has a more degree of freedom in manufacturing an optical wavelength converter without restriction on a specific crystal axis direction.

What is claimed is:

1. An optical wavelength converter comprising:
   a waveguide passage made of an organic nonlinear optical crystal; and
   a substrate provided in contact with the waveguide passage to form an optical wavelength converter,
   at least two dielectric main axes of the nonlinear optical crystal being inclined with respect to an extending direction of the waveguide passage variance means for changing a refractive index of the waveguide passage to increase overlap integration of an electric field distribution of second harmonics and excited nonlinear polarization of said optical wavelength converter, thereby improving the optical wavelength converting efficiency of said optical wavelength converter.

2. An optical wavelength converter according to claim 1, wherein the waveguide passage is a columnar core, the substrate is a clad enclosing the core, and the columnar core is made of said organic nonlinear optical crystal which satisfies the expression $n^{\omega} > n^{2\omega}$ where $n^{\omega}$ is a refractive index with respect to polarization of primary light propagating in the extending direction of the waveguide passage and $n^{2\omega}$ is a refractive index with respect to polarization of the second harmonics.

* * * * *